United States Patent
Salazar et al.

(10) Patent No.: US 10,371,362 B2
(45) Date of Patent: Aug. 6, 2019

(54) RUNWAY FIXTURE RING

(71) Applicant: Salstan Enterprises, Inc., Grand Terrace, CA (US)

(72) Inventors: Abel Alex Salazar, Bellflower, CA (US); Stanley L. Stosel, San Pedro, CA (US)

(73) Assignee: SALSTAN ENTERPRISES, INC., Grand Terrace, CA (US)

(*) Notice: Subject to any disclaimer, the term of this patent is extended or adjusted under 35 U.S.C. 154(b) by 203 days.

(21) Appl. No.: 15/639,453

(22) Filed: Jun. 30, 2017

(65) Prior Publication Data

US 2017/0299160 A1    Oct. 19, 2017

Related U.S. Application Data

(63) Continuation of application No. 14/923,129, filed on Oct. 26, 2015, now Pat. No. 9,696,020.

(51) Int. Cl.
| | |
|---|---|
| *B64F 1/20* | (2006.01) |
| *F21S 8/00* | (2006.01) |
| *F21S 8/02* | (2006.01) |
| *F21V 21/04* | (2006.01) |
| *F21V 21/14* | (2006.01) |
| *F21W 111/06* | (2006.01) |

(52) U.S. Cl.
CPC ............. *F21V 21/14* (2013.01); *B64F 1/205* (2013.01); *F21S 8/022* (2013.01); *F21S 8/032* (2013.01); *F21V 21/04* (2013.01); *F21W 2111/06* (2013.01)

(58) Field of Classification Search
CPC .......... F21W 2111/06; F21W 2111/02; E01G 9/547; E01G 9/582; B64F 1/205; F21S 8/022; F21S 8/032; F21V 21/36; F21V 21/14
See application file for complete search history.

(56) References Cited

U.S. PATENT DOCUMENTS

| | | | |
|---|---|---|---|
| 5,003,441 A * | 3/1991 | Crowe | F21S 8/022 362/183 |
| 7,699,489 B2 * | 4/2010 | Hagen | F21V 31/03 362/153 |
| 2015/0369469 A1 * | 12/2015 | Vamberi | F21S 8/022 362/153.1 |

* cited by examiner

Primary Examiner — Robert J May
Assistant Examiner — Leah Simone Macchiarolo
(74) Attorney, Agent, or Firm — Cislo & Thomas, LLP

(57) ABSTRACT

A method and device for easily installing and removing an airport light on a runway using a fixture ring having a base ring; an annular lip operatively connected to and extending radially inwardly from the base ring; a lift bar operatively connected to the annular lip and extending from one side to the diametrically opposite side of the annular lip; and an extractor, operatively connecting the lift bar to the annular lip to cause the lift bar to move up and down relative to the annular lip.

18 Claims, 3 Drawing Sheets

RUNWAY FIXTURE RING

CROSS REFERENCE TO RELATED APPLICATION

This patent application is a continuation application of U.S. patent application Ser. No. 14/923,129, filed Oct. 26, 2015 which application is incorporated in its entirety here by this reference.

TECHNICAL FIELD

This invention relates to fixture rings for installing lights on runways, such as an airport runway.

BACKGROUND

Runway lights at an airport serve the vital purpose of guiding airplanes onto the runway at night. Eventually, the lights burnout or malfunction, requiring replacement. The runway lights are built to withstand abuse from the elements. Therefore, the runway lights can be heavy. In addition, so as to minimize any protrusion from the ground, the runway lights are made generally flat and flush with the ground. This makes replacement of the lights difficult. Therefore, for the foregoing reasons, there is a need for a fixture ring that allows for quick and easy installation and removal of the runway lights from the runway.

SUMMARY

The present invention is directed to fixture rings to be mounted onto the holes in the ground, referred to as cans, that receive runway lights. The fixture ring has a base ring and an annular lip protruding radially inwardly from the base ring, the annular lip dimensioned to allow the runway light to be seated within the fixture ring without falling through. The fixture ring further comprises a lift bar with an associated pair of extractors that can move the lift bar up and down relative to the base ring. In some embodiments, a spacer may be provided to properly distance the lift bar relative to the runway light.

DETAILED DESCRIPTION OF THE INVENTION

Figure 1:
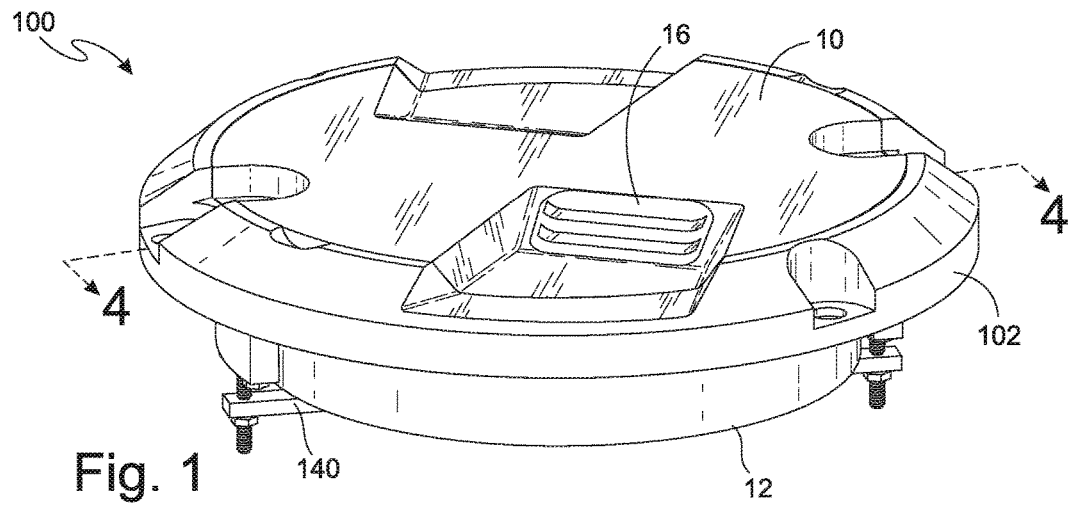
FIG. 1 shows a perspective view of an embodiment of the fixture ring with a runway light installed.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The fixture ring 100 of the present invention allows for easy installation and removal of airport runway lights 10. The fixture ring 100 can also be used in any other situation in which lighting is installed on the ground. With reference to the figures, the fixture ring 100 comprises a base ring 102, an annular lip 120, a lift bar 140, and a pair of extractors 160a, 160b. The base ring 102 is defined by a top 104, a bottom 106 opposite the top 102, an outer perimeter 108, and an inner perimeter 110, the base ring 102 defining a central axis A. The annular lip 120 may be operatively connected to and extend radially inwardly from the base ring 102, and in particular, from the inner perimeter 110 of the base ring 102. The lift bar 140 may be operatively connected to the annular lip 120. The pair of extractors 160a, 160b may operatively connect the lift bar 140 to the annular lip 120 in a manner that allows the lift bar 140 to move up and down relative to the annular lip 120.

Figure 2:
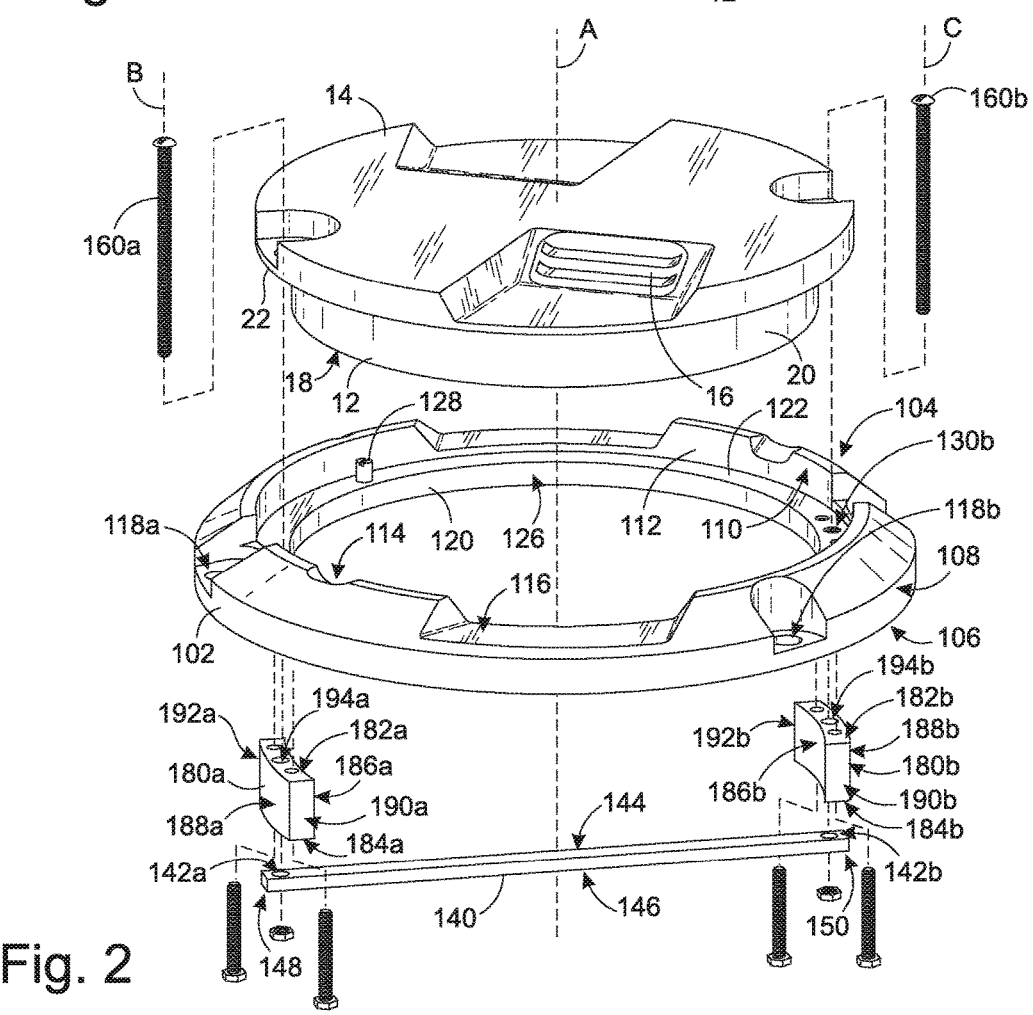
FIG. 2 shows an exploded view of the fixture ring shown in FIG. 1.
Figure 3:
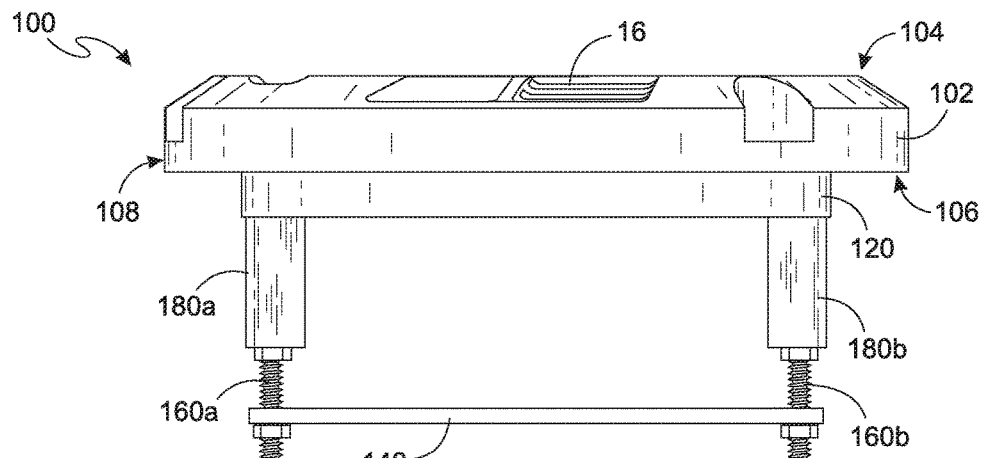
FIG. 3 shows a side elevation view of the fixture ring in FIG. 1.
Figure 4:
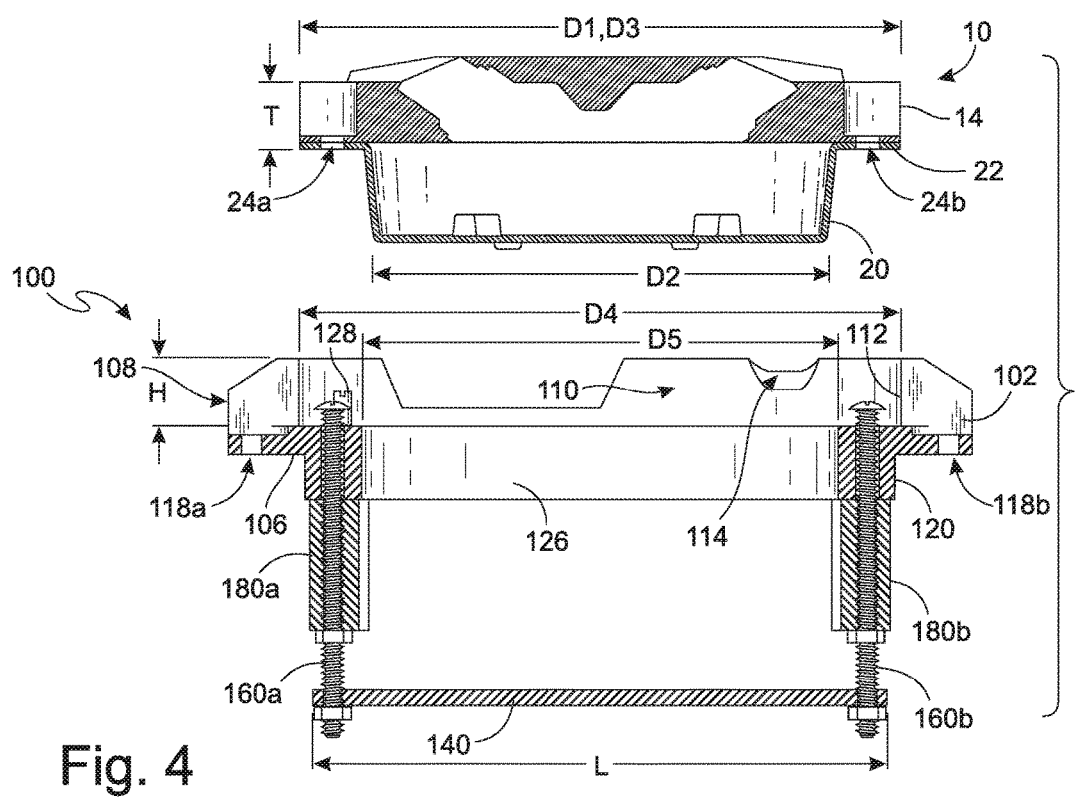
FIG. 4 shows a cross section of the fixture ring through line 4-4 shown in FIG. 1.
Figure 5:
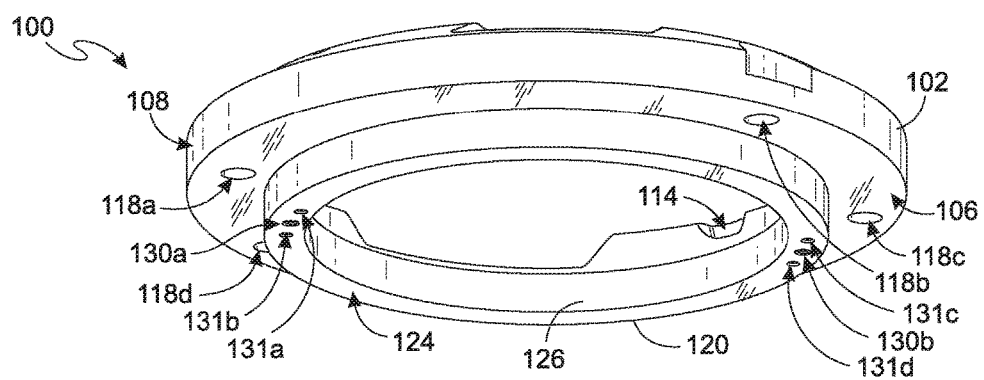
FIG. 5 shows a perspective view of the embodiment shown in FIG. 1 from the bottom without the runway light installed and with the lift bar and the spacers removed for clarity.

The fixture ring 100 of the present invention is preferably used with runway lights 10, such as those manufactured by Crouse-Hinds. As shown in FIGS. 1 and 2 typically, the runway lights 10 have an inner cover 12 that houses the lighting device and the electricals for the lighting device, and an optical housing 14 mounted on top of the inner cover 12 to contain and protect the lighting device underneath. The optical housing 14 comprises a lens 16 through which the lighting device can emit light. The inner cover 12 is generally cylindrical in shape defined by a bottom end 18, and a cylindrical sidewall 20 extending upwardly therefrom terminating at a flanged lip 22 that defines an opening. The diameter D1 of the flanged lip 22 is greater than the diameter D2 of sidewall 20. The optical housing 14 is circular in shape and mounts on top of the flanged lip 22. In general, the diameter D3 of the optical housing 14 is substantially similar to the diameter D1 of the flanged lip 22. Therefore, the optical housing 14 can be fastened to the inner cover 12 using fasteners to attach the perimeter of the optical housing 14 to the flanged lip 22. The runway lights 10 may further comprise a plurality of through-holes 24a, 24b through the optical housing 14 and the flanged lip 22 to allow the runway lights 10 to be fastened to the fixture ring 100. In general, the runway lights 10 have at least two diametrically opposed through-holes 24a, 24b adjacent to the perimeter of the optical housing 14.

The inner perimeter 110 of the base ring 102 defines a base ring inner diameter D4. The base ring inner diameter D4 is substantially similar to the optical housing diameter D3 and the flanged lip diameter D1 of the inner cover 12. The annular lip 120 also defines an annular lip inner diameter D5. The annular lip inner diameter D5 is substantially similar to the sidewall diameter D2 and smaller than the base ring inner diameter D5, the optical housing diameter D3, and the flanged lip diameter D1. Therefore, when the runway light 10 is inserted through the fixture ring 100, the annular lip 120 serves as a ledge upon which the flanged lip 22 of the inner cover 12 can be mounted so as not to pass all the way through the fixture ring 100.

The inner perimeter 110 of the base ring 102 is defined by an internal wall 112. The height H of the internal wall 112 measured from the top 122 of the annular lip 120 to the top 104 of the base ring 102 is substantially similar to the thickness T of the optical housing 14. Therefore, when the runway light 10 is mounted on the base ring 102 such that the flanged lip 22 of the inner cover 12 rests on top of the annular lip 120, the top of the optical housing 14 is flush with the top 104 of the base ring 102. As is, this makes removal of the runway light 10 from the fixture ring 100 very difficult.

In some embodiments, the top 104 of the base ring 102 comprises a slot 114 slanting towards the central axis A and the bottom 106 of the base ring 102. The slot 114 allows a tool having a flat end to be inserted along the slot 114 and against the optical housing 14. The tool can then be used to lift the optical housing 14 out from the base ring 102. If, however, the surface of the optical housing 14 does not have any cutouts or traction, then it will be difficult for the tool to lift the optical housing 14 out of the base ring 102. As discussed further below, this problem is solved with the lift bar 140.

In some embodiments, additional features of the base ring 102 include a cutout 116 that lowers the height H of the base ring wall 112 at the cutout 116. This facilitates exposure of the light from the lighting device. The base ring 102 may further comprise a plurality of through-holes 118a-d intermittently and angularly spaced apart about the outer perimeter 108. Fasteners can be inserted through the through-holes 118a-d to secure the fixture ring to the ground or the can.

The annular lip 120 is defined by a top surface 122, a bottom surface 124 opposite the top surface 122, and an inner perimeter surface 126 that defines the annular lip inner diameter D5. Since the annular lip 120 is radially inward relative to the base ring 102, the annular lip inner diameter D5 is smaller than the base ring inner diameter D4. In some embodiments, the top surface 122 of the annular lip 120 comprises a locating peg 128 protruding upwardly towards the top 104 of the base ring 102 and parallel to the central axis A. The locating peg 128 assures that the runway light 10 is properly installed on the fixture ring 100. The flanged lip 22 and bottom of the optical housing 14 may comprise an opening to receive the locating peg 128. The position of the locating peg 128 and the opening on the flanged lip 22 and the optical housing 14 are such that when the locating peg 128 is seated within the opening, the lens 16 of the optical housing 14 is aligned with the cutout 116 on the fixture ring 100 so that the internal wall 112 of the base ring 102 does not interfere with the light emitting from the lens 16.

In some embodiments, the top surface 122 of the annular lip 120 comprises a first through-hole 130a and a second through-hole 130b, each through-hole 130a, 130b extending from the top surface 122 to the bottom surface 124 of the annular lip 120. The positioning of the through-holes 130a, 130b of the annular lip 120 are such that when the runway light 10 is mounted on the fixture ring 100, the first and second through-holes 130a, 130b of the annular lip 120 are aligned with two of the through-holes 24a, 24b of the runway light 10. Preferably, two of the through-holes 130a, 130b of the annular lip 120 are on the diametrically opposite sides of each other. The runway light 10 and the annular lip 120 may comprise additional through-holes through which the runway light 10 can be fastened to the annular lip 120.

In some embodiments, the fixture ring 100 may further comprise a pair of spacers 180a, 180b operatively connected to the annular lip 120 and projecting away from the base ring 102. Each spacer 180a, 180b may be in the shape of a curved wall having a top side 182a, 182b, a bottom side 184a, 184b opposite the top side 182a, 182b, a front side 186a, 186b adjacent to the top side 182a, 182b and the bottom side 184a, 184b, and a back side 188a, 188b opposite the front side 186a, 186b and adjacent to the top side 182a, 182b and the bottom side 184a, 184b, and two lateral sides 190a, 190b, 192a, 192b opposite each other and adjacent to the top side 182a, 182b, the bottom side 184a, 184b, the front side 186a, 186b, and the back side 188a, 188b. Each spacer 180a, 180b may comprise a main channel 194a, 194b extending from their respective top sides 182a, 182b to their respective bottom sides 184a, 184b. When the spacers 180a, 180b are operatively connected to the annular lip 120, each channel 194a, 194b is aligned with one of the diametrically opposed through-holes 130a, 130b of the annular lip 120 and one of the diametrically opposed through-holes 24a, 24b of the runway light 10. Therefore, when the runway light 10 is properly seated in the fixture ring 100, a first through hole 24a on a first side of the runway light 10 may be aligned with a first through hole 130a of the annular lip 120, which in turn is in line with a first channel 194a of the first spacer 180a. A second through hole 24b on the diametrically opposite side of the first through hole 24a of the runway light 10 is aligned with a second through hole 130b of the annular lip 120, which in turn is in line with a second channel 194b of the second spacer 180b. A first extractor 160a can be fed through the first through hole 24a of the runway light 10, the first through hole 130a of the annular lip 120, and the first channel 194a of the first spacer 180a to connect with a first through hole 142a of the lift bar 140. A second extractor 160b can be fed through the second through-hole 24b of the runway light 10, the second through-hole 130b of the annular lip 120, and the second channel 194b of the second spacer 180b to connect with a second through-hole 142b of the lift bar 140. Vertical movement of the extractors 160a, 160b causes vertical movement of the lift bar 140. If the runway light 10 abuts against the lift bar 140, then vertical movement of the lift bar 140 will cause vertical movement of the runway light 10.

Vertical movement of the extractors 160a, 160b can be achieved in a variety of different ways. In some embodiments, the extractors 160a, 160b may be threaded like a bolt or a screw. In such an embodiment, at least one of the through holes 24a, 24b, 130a, 130b of the runway light 10 or the annular lip 120, the channels 194a, 194b of the spacers 180a, 180b, or the through-holes 142a, 142b of the lift bar 140 may be threaded. For example, the first and second spacers 180a, 180b may comprise first and second threaded channels 194a, 194b, respectively, each channel 194a, 194b parallel to the central axis A, and each channel 194a, 194b aligned with one through-hole 130a, 130b of the annular lip 120. Rotation of the extractors 160a, 160b in a first direction (e.g. clockwise) causes the extractors 160a, 160b to move out of their respective spacer 180a, 180b in an upward direction causing the lift bar 140 to follow in the upward direction. Rotation of the extractors 160a, 160b in a second direction opposite the first direction (e.g. counter-clockwise) causes the extractors 160a, 160b to move downwardly into their respective spacers 180a, 180b. Movement of the lift bar 140 causes upward and downward movement of the runway light 10.

In the preferred embodiment, the extractors 160a, 160b are a pair of bolts. The length of each extractor 160a, 160b, the height of the runway light 10, the height of the annular lip 120, and the height of the spacers 180a, 180b are all configured so that when the runway light 10 is properly seated in the fixture ring 100, and the extractors 160a, 160b are fully inserted into their respective through-holes, the lift bar 140 and the inner cover 12 of the runway light 10 are spaced apart by a gap. This gap can be closed by rotating the extractor 160a, 160b in the proper direction, which causes the lift bar 140 to rise up. Once the lift bar 140 abuts against the inner cover 12, further rotation of the extractors 160a, 160b from the fixture ring 100 causes the runway light 10 to rise upwardly. At some point, the bottom of the optical housing 14 or lip 22 of the inner cover 12 will be exposed by the slot 114, at which point the user can slide a tool through the slot 114 and under the optical housing 14 to create leverage to continue to lift the runway light 10 out of the fixture ring 100.

The lift bar 140 has a top side 144, a bottom side 146 opposite the top side 144, a first end 148, and a second end 150 opposite the first end 148. The distance from the first end 148 to the second end 150 defines a length L of the lift bar 140. In the preferred embodiment, the length L of the lift bar 140 spans at least the annular lip inner diameter D5, and preferably to the annular lip outer diameter. Therefore, the lift bar 140 may extend substantially from the first through-hole 130a of the annular lip 120 to the second through-hole 130b of the annular lip 120 located on the diametrically opposite side of the first through-hole 130a of the annular lip 120. The first through-hole 142a of the lift bar 140 adjacent to the first end 148 is aligned with the first through-hole 130a of the annular lip 120, and the second through-hole 142b of the lift bar 140 adjacent to the second end 150 is aligned with the second through-hole 130b of the annular lip 120.

In use, a runway light 10 can be installed on a runway by securing a fixture ring 100 onto a can on the runway and placing a runway light 10 onto the fixture ring 100. The runway light 10 can be fastened to the fixture ring 100 using typical fasteners. If the top of the runway light 10 is not substantially flush with the top 104 of the base ring 102, then the pair of extractors 160a, 160b can be adjusted to lower the lift bar 140 until the top of the runway light is flush with the top 104 of the base ring 102. When ready to remove the runway light 10, the pair of extractors 160a, 160b can be adjusted to raise the lift bar 140 until the top of the runway light 10 (e.g. the optical housing 12) is sufficiently exposed to gain leverage for removing the runway light 10, for example, by inserting a tool underneath the flanged lip 22 of runway light 10. The tool may be inserted via the slot 114. Preferably, the extractors 160a, 160b are threaded on their outer surface such that rotation of the extractors 160a, 160b in a first direction causes the lift bar 140 to rise and rotation of the extractors 160b in a second direction opposite the first direction causes the lift bar 140 to lower. Therefore, adjustment of the extractors 160a, 160b requires rotation of the extractors 160a, 160b about their longitudinal axes B, C.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A fixture ring for seating runway lights, the fixture ring comprising:
   a. a base ring defined by a top, a bottom opposite the top, an outer perimeter, and an inner perimeter, the base ring defining a central axis and a base ring inner diameter, wherein the top comprises a slot slanting towards the inner perimeter and the bottom, a cutout that lowers a height of the base ring at the cutout, and a plurality of through-holes intermittently and angularly spaced apart about the outer perimeter, the through-holes extending from the top of the base ring to the bottom of the base ring and parallel to the central axis;
   b. an annular lip extending radially inwardly from the inner perimeter of the base ring, the annular lip defining an annular lip inner diameter, wherein the annular lip inner diameter is smaller than the base ring inner diameter, the annular lip defining a top surface, a bottom surface opposite the top surface, and an inner perimeter surface, wherein the top surface of the annular lip comprises a first through-hole and a second through-hole, each through-hole extending from the top surface to the bottom surface of the annular lip, wherein the first and the second through-holes of the annular lip are located at diametrically opposite sides, wherein the top surface of the annular lip further comprises a locating peg protruding upwardly towards the top of the base ring and parallel to the central axis;
   c. a spacer projecting away from the top and bottom of the base ring, the spacer comprising a threaded channel extending therethrough, the threaded channel parallel to the central axis, and the threaded channel aligned with one of the first or second through-holes of the annular lip;
   d. a lift bar operatively connected to the spacer, the lift bar comprising a top side, a bottom side opposite the top side, a first end, and a second end opposite the first end, a first through-hole of the lift bar adjacent to the first end and extending from the top side of the lift bar to the bottom side of the lift bar, and a second through-hole of the lift bar adjacent to the second end and extending from the top side of the lift bar to the bottom side of the lift bar; and
   e. a bolt insertable through the first through-hole of the annular lip, the threaded channel of the first spacer, and the first through-hole of the lift bar, wherein rotation of the bolt in a first direction causes the lift bar to rise up towards the base ring, and rotation of the bolt in a second direction causes the lift bar to descend away from the base ring.

2. A fixture ring for seating runway lights, the fixture ring comprising:
   a. a base ring defined by a top, a bottom opposite the top, an outer perimeter, and an inner perimeter, the base ring defining a central axis and a base ring inner diameter;
   b. an annular lip extending radially inwardly from the base ring to the central axis, the annular lip defining an annular lip inner diameter, wherein the annular lip inner diameter is smaller than the base ring inner diameter, the annular lip defining a top surface, a bottom surface opposite the top surface, and an inner perimeter surface;
   c. a lift bar operatively connected to the annular lip, the lift bar having a top side, a bottom side opposite the top side, a first end, and a second end opposite the first end, wherein a distance from the first end to the second end defines a length, wherein the length of the lift bar spans at least the annual lip diameter; and
   d. an extractor, operatively connecting the lift bar to the annular lip to cause the lift bar to move up and down relative to the annular lip.

3. The fixture ring of claim 2, wherein the top of the base ring comprises a slot slanting towards the inner perimeter and the bottom.

4. The fixture ring of claim 2, wherein the base ring comprises a cutout that lowers a height of the base ring at the cutout.

5. That fixture ring of claim 2, wherein the base ring comprises a plurality of through-holes intermittently and angularly spaced apart about the outer perimeter, the through-holes extending from the top to the bottom and parallel to the central axis.

6. The fixture ring of claim 2, wherein the top surface of the annular lip comprises a locating peg protruding upwardly towards the top of the base ring and parallel to the central axis.

7. The fixture ring of claim 2, wherein the top surface of the annular lip comprises a through-hole, the through-hole extending from the top surface to the bottom surface of the annular lip.

8. The fixture ring of claim 7, further comprising a spacer operatively connected to the annular lip and projecting away from the base ring, wherein the spacer comprises a channel extending therethrough, the channel parallel to the central axis, and the channel aligned with the through-hole of the annular lip.

9. The fixture ring of claim 2, wherein the lift bar extends substantially from a first through-hole of the annular lip to a second through-hole of the annular lip located on a diametrically opposite side of the first through-hole of the annular lip, wherein a first through-hole of the lift bar adjacent to the first end is aligned with the first through-hole of the annular lip, and a second through-hole of the lift bar adjacent to the second end is aligned with the second through-hole of the annular lip.

10. The fixture ring of claim 2, wherein the extractor is a bolt insertable through a through-hole of the annular lip and a through-hole of the lift bar, wherein rotation of the bolt in a first direction causes the lift bar to rise up towards the base ring, and rotation of the bolt in a second direction causes the lift bar to descend away from the base ring.

11. The fixture ring of claim 2, further comprising a first spacer and a second spacer operatively connected to the annular lip on diametrically opposite sides, wherein the first spacer comprises a first channel and the second spacer comprises a second channel, wherein the first channel of the first spacer is aligned with a first through-hole of the annular lip and a first through-hole of the lift bar, and the second channel of the second spacer is aligned with a second through-hole of the annular lip and a second through-hole of the lift bar.

12. A method of installing and replacing lighting on runway, comprising:
 a. securing a fixture ring onto a can, wherein the fixture ring comprises a base ring defined by a top, a bottom opposite the top, an outer perimeter, and an inner perimeter, the base ring defining a central axis and a base ring inner diameter; an annular lip operatively connected to and extending radially inwardly from the inner perimeter of the base ring, the annular lip defining an annular lip inner diameter, wherein the annular lip inner diameter is smaller than the base ring inner diameter, the annular lip defining a top surface, a bottom surface opposite the top surface, and an inner perimeter surface; a lift bar operatively connected to the annular lip, the lift bar having a top side, a bottom side opposite the top side, a first end, and a second end opposite the first end, wherein a distance from the first and to the second end defines a length, wherein the length of the lift bar spans at least the annular lip inner diameter; and an extractor, operatively connecting the lift bar to the annular lip to cause the lift bar to move up and down relative to the annular lip;
 b. placing a runway light onto the fixture ring, the runway light having a top and a bottom.

13. The method of claim 12, wherein if the top of the runway light is not flush with the top of the base ring, further comprising using the extractor to adjust the lift bar until the top of the runway light is flush with the top of the base ring.

14. The method of claim 13, further comprising using the extractor to raise the lift bar until the top of the runway lights is sufficiently exposed to gain leverage for removing the runway light.

15. The method of claim 14, wherein the top of the base ring comprises a slot for inserting a tool when the top of the runway light is sufficiently exposed to gain leverage for removing the runway light.

16. The method of claim 15, wherein the extractor comprises a threaded outer surface such that rotation of the extractor in a first direction causes the lift bar to raise and rotation of the extractor in a second direction opposite the first direction causes the lift bar to lower.

17. The method of claim 16, wherein the fixture ring further comprise a spacer separating the lift bar from the annular lip.

18. The method of claim 17, wherein the spacer comprises a threaded channel to receive the extractor.

\* \* \* \* \*